United States Patent [19]

Bacskai

[11] 4,107,154
[45] Aug. 15, 1978

[54] ANIONIC COPOLYMERIZATION OF 2-PYRROLIDONE WITH $C_7$-$C_{12}$ LACTAM

[75] Inventor: Robert Bacskai, Kensington, Calif.

[73] Assignee: Chevron Research Company, San Francisco, Calif.

[21] Appl. No.: 773,441

[22] Filed: Mar. 2, 1977

Related U.S. Application Data

[63] Continuation-in-part of Ser. No. 687,968, May 19, 1976, Ser. No. 724,801, Sep. 20, 1976, and Ser. No. 724,802, Sep. 20, 1976.

[51] Int. Cl.² ............................................. C08G 69/24
[52] U.S. Cl. ................... 528/312; 252/428; 252/431 C; 252/431 N; 252/437; 260/326.5 A; 528/313; 528/315; 528/318; 528/325; 528/326
[58] Field of Search ............................. 260/78 P, 78 L

[56] References Cited

U.S. PATENT DOCUMENTS

| | | | |
|---|---|---|---|
| 2,638,463 | 5/1953 | Ney et al. | 260/78 P |
| 3,346,566 | 10/1967 | Chiddix et al. | 260/239.3 R |
| 3,681,294 | 8/1972 | Jarovitzky | 260/78 P |
| 3,681,295 | 8/1972 | Jarovitzky | 260/78 P |
| 3,721,652 | 3/1973 | Barnes | 260/78 P |
| 3,793,258 | 2/1974 | Reinking et al. | 260/78 P |
| 3,835,100 | 9/1974 | Sekiquchi et al. | 260/78 P |
| 3,875,121 | 4/1975 | Brassat et al. | 260/78 P |
| 3,919,175 | 11/1975 | Kralicek et al. | 260/78 P |

FOREIGN PATENT DOCUMENTS

| | | |
|---|---|---|
| 158,341 | 6/1975 | Czechoslovakia. |
| 82,403 | 7/1972 | Japan. |

*Primary Examiner*—Harold D. Anderson
*Attorney, Agent, or Firm*—Dix A. Newell; Thomas G. DeJonghe; Lawrence S. Squires

[57] ABSTRACT

Copolymers of 2-pyrrolidone and $C_7$-$C_{12}$ lactams are provided in solid form, at relatively high rates and molecular weights by polymerization in the presence of alkaline catalysts and carbon dioxide, by the inclusion of an auxiliary catalyst and a copolymerization promoter comprising certain onium salts and N-acyl lactams, respectively.

20 Claims, No Drawings

ANIONIC COPOLYMERIZATION OF 2-PYRROLIDONE WITH $C_7$-$C_{12}$ LACTAM

PRIOR APPLICATIONS

This application is a joint continuation-in-part of application Ser. No. 687,968, filed May 19, 1976, Ser. No. 724,801, filed Sept. 20, 1976, and Ser. No. 724,802, filed Sept. 20, 1976.

BACKGROUND OF THE INVENTION

Poly-2-pyrrolidone (also known as nylon-4) is composed of repeating $C_4$ structural units $+NH(CH_2)_3$-$C(O)+$. The solid, melt-spinnable homopolymer of 2-pyrrolidone is produced by the alkaline-catalyzed polymerization of 2-pyrrolidone in the presence of carbon dioxide, using a catalyst composed of alkali metal lactamate or tetraalkyl ammonium lactamate (see U.S. Pat. No. 3,721,652). Copolymers of 2-pyrrolidone with $C_7$-$C_{12}$ lactams have $C_7$-$C_{12}$ structural units substituted for some of the $C_4$ structural units of poly-2-pyrrolidone. Copolymers of 2-pyrrolidone with capryllactam ($C_8$) or laurolactam ($C_{12}$) reportedly have been made by alkaline-catalyzed polymerization, Czech Pat. No. 158,341, Chem. Ab. 84: 44962d.

It is an object of the present invention to achieve the rapid alkaline-catalyzed copolymerization of 2-pyrrolidone with $C_7$-$C_{12}$ lactams in the presence of carbon dioxide. It is a further object of the present invention to produce a solid, melt-spinnable copolymer of 2-pyrrolidone and $C_7$-$C_{12}$ lactams which contains more than 10 mol percent of $C_7$-$C_{12}$ structural units. It is a further object of the present invention to produce a solid copolymer of 2-pyrrolidone and a $C_7$-$C_{12}$ lactam possessing even greater thermal stability than the solid 2-pyrrolidone homopolymer.

BRIEF SUMMARY OF THE INVENTION

Relatively rapid copolymerization of 2-pyrrolidone with $C_7$-$C_{12}$ lactams is achieved in the presence of alkaline catalyst and carbon dioxide by the inclusion of an auxiliary catalyst and a copolymerization promoter comprising certain onium salts and N-acyl lactams, respectively. Copolymerization is generally carried out at temperatures in excess of those optimal for the homopolymerization of 2-pyrrolidone. The copolymer so-produced is a solid polymer of weight average molecular weight generally in excess of about 10,000, and may incorporate 2 mol percent and preferably 5 to 10 mol percent or more of $C_7$-$C_{12}$ structural units derived from the $C_7$-$C_{12}$ lactam.

DESCRIPTION OF PREFERRED EMBODIMENT

Although the alkaline-catalyzed copolymerization of 2-pyrrolidone with higher lactams is known, the "carbon dioxide process" (U.S. Pat. No. 3,721,652), which rapidly produces the solid, white, melt-spinnable, high-molecular-weight homopolymer (nylon-4), is killed or inhibited by the presence of higher lactams. Surprisingly, the present invention produces a copolymer of 2-pyrrolidone and $C_7$-$C_{12}$ lactams having all the foregoing favorable properties of the "carbon dioxide-produced" homopolymer, and, in addition, having greater thermal stability than the homopolymer.

In the preferred process of this invention, 2-pyrrolidone and a $C_7$-$C_{12}$ lactam are contacted with an alkaline polymerization catalyst, and auxiliary catalyst, and a copolymerization promotor, as well as carbon dioxide. The carbon dioxide, as has heretofore been taught, is believed to form an adduct with the alkaline polymerization catalyst. The $C_7$-$C_{12}$ lactams include enantholactam, capryllactam, undecanoyllactam and laurolactam. Preferably copolymers of enantholactam or laurclactam are produced.

THE ALKALINE POLYMERIZATION CATALYST

The alkaline polymerization catalyst is a lactamate salt, such as pyrrolidonate or $C_7$-$C_{12}$ lactamate, of the alkali or alkaline earth metals. The alkali metal lactamates, particularly alkali metal pyrrolidonate, are preferred. Potassium pyrrolidonate is a particularly preferred catalyst. The catalyst is produced by reacting the lactam with a source of alkali metal, such as the hydroxide or alkoxide, followed by removal of the coproducts of this reaction. In a preferred embodiment, potassium hydroxide is reacted with excess 2-pyrrolidone and the coproduct of the reaction, water, is removed to give a substantially anhydrous catalyst solution in 2-pyrrolidone. The alkaline polymerization catalyst is normally used in amounts of about 1-20 mol percent, based on total lactam (2-pyrrolidone + $C_7$-$C_{12}$ lactam) in the polymerizate, including the lactam salt itself. Preferably about 3-10 mol percent of an alkali metal pyrrolidonate catalyst is used.

THE AUXILIARY CATALYST

What is termed the "auxiliary catalyst" of the present invention is, generally, a quaternary Group VA "onium" salt, more particularly the ammonium or phosphonium salt. A preferred class of onium salts is the halides and carboxylates, such as quaternary ammonium chloride, phosphonium bromide and ammonium acetate. The onium salts of this invention contain lower alkyl, lower alkylaryl, and/or lower aralkyl groups. Tetraalkyl quaternary ammonium halide is the preferred auxiliary catalyst. Representative alkyl groups include methyl, ethyl, propyl, isopropyl, butyl, isobutyl, t-butyl, hexyl, etc. Alkylaryl ammonium halides, such as phenyl trimethyl ammonium halide and tolyl triethyl ammonium halide, are included within the scope of the ammonium halides of this invention. Also included are compounds such as $R^1R^2R^3(\phi CH_2)NX$, wherein $\phi$ represents phenyl and $R^1$, $R^2$ and $R^3$ may be the same or different lower alkyl groups or other lower aralkyl groups, and X is a halide. These aralkyl groups will normally contain 7-12 carbon atoms. The halide is preferably a chloride, bromide or iodide, and most preferably a chloride. The carboxylate is preferably a tetra($C_1$-$C_6$)alkyl ammonium carboxylate. The carboxylate is preferably the alkanoate of a $C_1$-$C_6$ alkanoic acid, most preferably the acetate. The onium salt may be used as a combination of species with phosphonium and ammonium salts used together, and tetraalkyl salt used with lower alkylaryl salts, and halides used with carboxylates, chlorides with bromides, etc. The tetra($C_1$-$C_6$)alkyl ammonium halides are generally most preferred.

The auxiliary catalyst should be substantially soluble under the alkaline conditions of copolymerization. The auxiliary catalyst is normally used in amount corresponding to about 0.1–2 mols auxiliary catalyst to each mol of alkaline catalyst (1: 0.1 – 2 mol ratio), preferably in mol ratio of about 1: 0.2 – 1.5, and most preferably in a mol ratio of about 1 : 1.

CARBON DIOXIDE AND CATALYST PREPARATION

The components of the polymerizate may be contacted in any order beginning with the alkaline polymerization catalyst as one of the components. It is preferred but not necessary to add the auxiliary catalyst to the previously carbonated alkaline catalyst. In a preferred embodiment, the alkaline catalyst is formed in a solution of 2-pyrrolidone. The dehydrated catalyst solution contains less than about 0.1 weight percent water. Carbon dioxide is then added to the dehydrated catalyst solution in the amount necessary to provide about 0.1–0.5 mols of carbon dioxide per mol of alkaline polymerization catalyst (1: 0.1 - 0.5 mol ratio), preferably about 1: 0.3 mol ratio, at a temperature of about 25°–30° C. The auxiliary catalyst is then added in the required amount at about the same temperature. The copolymerization promoter may also be added at this time or later.

In another embodiment, a catalyst system is prepared by adding carbon dioxide to a mixture of alkali metal and/or tetraalkyl ammonium salts of 2-pyrrolidone and/or $C_7$–$C_{12}$ lactam. Such a mixture is believed to be formed by the reaction of onium salts with alkali metal lactamates which produces an inert alkali salt, such as the alkali halide, as a coproduct. In this embodiment of the process, carbon dioxide may form adducts with any of the lactamate salts.

The auxiliary catalyst may also be prepared in situ by, for example, dissolving a trialkyl amine in 2-pyrrolidone and adding an alkali halide while maintaining the temperature at about 10°–50° C. While it is preferred to contact the auxiliary catalyst, the alkaline polymerization catalyst and carbon dioxide in a 2-pyrrolidone solution, or in a solution of 2-pyrrolidone and a $C_7$–$C_{12}$ lactam, inert solvents may be used in whole or in part to replace the lactams in the formation of a catalyst system. Sulfur dioxide is believed to be a partial substitute for carbon dioxide, and its use is not barred in the practice of this invention.

THE COPOLYMERIZATION PROMOTER

The preferred copolymerization promoter of the present invention is an N-acyl lactam, several of which have heretofore been described (see U.S. Pat. No. 3,721,652), or equivalently, compounds which are believed to form N-acyl lactams upon reaction with the lactams of this invention, such as acetic anhydride. N-acetyl pyrrolidone is a particularly preferred copolymerization promoter. The dimer of 2-pyrrolidone, systematically named 1-(1-pyrrolin-2-yl)-2-pyrrolidone, is another preferred N-acyl lactam which finds use as a copolymerization promoter in this process. In general, the promoter is used in amounts of 0.05–1.5 mol percent, preferably 0.05–0.5 mol percent, based on total lactam.

COPOLYMERIZATION CONDITIONS

Solid copolymers of 2-pyrrolidone and $C_7$–$C_{12}$ lactams are produced by contacting a mixture of 2-pyrrolidone and $C_7$–$C_{12}$ lactam in the presence of a catalyst system consisting of an alkaline polymerization catalyst, an onium salt (auxiliary catalyst), carbon dioxide and an N-acyl lactam copolymerization promoter. The catalyst system is preferably formed at a temperature of about 20°–50° C, but the copolymerization is preferably performed at temperatures in the range of about 40°–100° C, and preferably in excess of about 50° C and most preferably at about 50°–80° C. Polymerization times are normally 8–72 hours and preferably about 8–48 hours. In continuous polymerization operation, polymerization time refers to average residence under copolymerization conditions. Preferably an alkali metal lactamate, a tetraalkyl ammonium halide, carbon dioxide and N-acetyl pyrrolidone are contacted with a mixture of 2-pyrrolidone and a $C_7$–$C_{12}$ lactam for about 8–24 hours at about 50°–80° C.

Preparation of copolymers of 2-pyrrolidone, according to the normal process of this invention, can be carried out with various amounts of monomers, catalysts, auxiliary catalyst, copolymerization promoter, inert nonsolvent liquids, and other additives — the amount of each being properly coordinated to produce the most effective copolymerizations — with or without stirred reactors, by bulk polymerization, solution polymerization, or otherwise, continuously or batchwise. Although the preferred conditions and amounts of the components in the reaction have been given, it is understood that these are not intended to be limitations to copolymerization, since it may be possible to achieve substantial copolymerization outside the preferred ranges.

Copolymerization conditions are normally selected to provide a solid copolymer of 2-pyrrolidone and a $C_7$–$C_{12}$ lactam having a weight average molecular weight of at least about 10,000, preferably having a weight average molecular weight of about 20,000–200,000, or more, which contains more than 2 mol percent, preferably 5–10 mol percent, and most preferably contains more than about 10 mol percent $C_7$–$C_{12}$ structural units derived from the $C_7$–$C_{12}$ lactam, but generally containing about 2–50 mol percent of the $C_7$–$C_{12}$ structural units. "Mol percent structural units" defines the average composition of the copolymer in terms of the monomeric lactams of which it is composed. A copolymer which is 10 mol percent $C_7$ units has an average composition of 10 $C_7$ units and 90 $C_4$ units per 100 monomeric units in the copolymer. The copolymer may be a random copolymer or a block copolymer, or in part a random copolymer and in part a block copolymer. In general, more $C_7$–$C_{12}$ lactam is incorporated into the copolymer by increasing the mol ratio of $C_7$–$C_{12}$ lactam to 2-pyrrolidone, or by increasing the temperature of polymerization as shown in the tables.

EXEMPLIFICATION

EXAMPLE 1

50 grams (0.587 m) of 2-pyrrolidone was mixed with 1.92 grams (0.0293 m) of 85.5% potassium hydroxide to give a 5 mol percent potassium pyrrolidonate solution. This solution was dehydrated by heating to incipient distillation at 2 mm pressure for 9 minutes. Sufficient carbon dioxide was added to this dehydrated solution to make a polymerizate containing 30 mol percent carbon dioxide based on potassium. A 12-gram portion of the carbonated pyrrolidonate solution was poured into a bottle containing 0.85 grams of freshly distilled enantholactam (b.p. 105° C/1 mm) and 0.82 grams (0.0075 m) of tetramethyl ammonium chloride. After thoroughly mixing the contents of the bottle, it was held at 50° C for 22 hours. At the end of this time, the solid polymer was chopped into small pieces, washed with water and dried to give 4.20 grams of polymer. Analysis of this polymer by NMR showed it to contain only homopoly-2-pyrrolidone without any copolymer.

EXAMPLE 2

This polymerization was carried out in essentially the same manner as Example 1, except that the polymerization bottle contained 0.1 gram (0.008 m) of N-acetylpyrrolidone in addition to enantholactam and tetramethylammonium chloride. The final yield was 6.78 grams of copolymer which contained 1 mol percent of enantholactam in the 2-pyrrolidone/enantholactam copolymer. Other runs were carried out and are tabulated in the following tables.

Extensive experimentation has shown that the lactams, piperidone ($C_5$), caprolactam ($C_6$) and enantholactam ($C_7$) do not homopolymerize or copolymerize with 2-pyrrolidone ($C_4$) at 50° C in the presence of alkaline polymerization catalyst and carbon dioxide, e.g., sodium or potassium pyrrolidonate and carbon dioxide. Furthermore, the lactam comonomers seem to poison the homopolymerization of 2-pyrrolidone and reduce the amount of nylon-4 obtained when they are present in the polymerizate. Thus, where the homopolymerization of 2-pyrrolidone with alkaline polymerization catalyst and carbon dioxide would normally produce 40% conversion to polypyrrolidone, the presence of 5 mol percent lactam comonomer in the polymerizate, under the identical conditions, reduces the conversion to 27-31% polypyrrolidone, and with 20 mol percent lactam comonomer in the feed, only a trace of polypyrrolidone is produced under the identical conditions. Furthermore, the use of N-acyl lactam promoters, such as acetic anhydride, does not promote copolymerization under the identical conditions.

In the following tables, all molecular weights are reported as the weight average molecular weight, determined from the specific viscosity 0.1 g of polymer or copolymer in 100 cc of m-cresol solution at 25° C. All reported percentages are mol percent, based on total lactam (2-pyrrolidone + comonomer), unless otherwise indicated. Percent conversion is calculated as 100 × (weight of polymer or copolymer)/(weight of total lactam) and total lactam, or total monomer, is, as has been heretofore defined, total 2-pyrrolidone including 2-pyrrolidonate salts, plus total comonomer.

TABLE I

The effect of Auxiliary Catalyst and Copolymerization Promoters in the Copolymerization of 2-pyrrolidone with $C_7$-$C_{12}$ Lactam

| Auxiliary Catalyst | Copolymerization Promoter | Mol Percent Enantholactam Comonomer | % Conversion[1] | Mol Percent Enantholactam in Copolymer[2] |
|---|---|---|---|---|
| None | None | 0 | 4 | 0 |
| None | None | 5 | 0[5] | — |
| 5 mol %[3] | None | 0 | 44 | 0 |
| 5 mol %[3] | None | 5 | 32 | 0 |
| None | 0.5 mol %[4] | 0 | 39 | 0 |
| None | 0.5 mol %[4] | 5 | 42 | 0 |
| 5 mol %[3] | 0.5 mol %[4] | 0 | 68 | 0 |
| 5 mol %[3] | 0.5 mol %[4] | 5 | 56 | 1 |

[1]Copolymerized for 22 hours at 70° C with alkaline polymerization catalyst consisting of 5 mol percent potassium pyrrolidonate, of which 30 mol percent is carbonated with $CO_2$.
[2]Estimated from NMR data
[3]Tetramethyl ammonium chloride
[4]N-acetyl pyrrolidone
[5]2 mol percent potassium pyrrolidone, of which 30 mol percent is carbonated with $CO_2$.

As shown in Table I, line 1, at least some homopolymerization of 2-pyrrolidone occurs at 70° C in the presence of alkaline polymerization catalyst and carbon dioxide (4% conversion), but the polymerization is completely inhibited by the addition of 5 mol percent enantholactam. Table I then goes on to show that the use of the auxiliary catalyst and copolymerization promoter of the present invention prevents the complete inhibition of the homopolymerization under the same conditions, but that this catalyst and promoter do not, by themselves, provide any detectable copolymer. Finally, as shown in the last line of Table I, the presence of the auxiliary catalyst and the copolymerization promoter produces copolymerization.

TABLE II

The effect of Temperature in the Copolymerization of 2-Pyrrolidone with $C_7$-$C_{12}$ Lactam

| Copolymerization Temperature, ° C | Percent Conversion[1] | Mw × $10^{-3}$ | Mol Percent Enantholactam in Copolymer[2] |
|---|---|---|---|
| 50 | 47 | 74 | 2 |
| 60 | 35 | 31 | 8 |
| 70 | 32 | 31 | 10 |
| 80 | 29 | 10 | 16 |

[1]Copolymerized for 22 hours at temperatures shown with 20 mol percent enantholactam; alkaline polymerization catalyst consisting of 5 mol percent potassium pyrrolidonate, of which 30 mol percent is carbonated with carbon dioxide, 5 mol percent tetramethyl ammonium chloride and 0.5 mol percent N-acetyl pyrrolidone.
[2]See footnote 2 of Table I.

TABLE III

The Effect of Comonomer Concentration in the Copolymerization of 2-pyrrolidone with $C_7$-$C_{12}$ Lactam

| Mol Percent Enantholactam Comonomer | Percent Conversion[1] | Mw × $10^{-3}$ | Mol Percent Enantholactam in Copolymer[2] |
|---|---|---|---|
| 5 | 29 | 10 | 3 |
| 20 | 29 | 10 | 16 |

[1]See footnote 1 of Table II. Copolymerization temperature 80° C.
[2]See footnote 2 of Table I.

As shown in Tables II and III, substantial conversion to copolymers of high molecular weight, containing substantial amounts of $C_7$-$C_{12}$ lactam, are possible in the practice of the present invention with the choice of higher than "normal" polymerization temperatures and larger amounts of $C_7$-$C_{12}$ lactam comonomer. The temperature effect is opposite to that observed in the homopolymerization of 2-pyrrolidone, where increasing the polymerization temperature over 40-°C produces less and less conversion to polypyrrolidone as the polymerization temperature rises, all other polymerization variables being the same.

TABLE IV

The Thermal Stability of $C_7$-$C_{12}$ Copolymers of 2-pyrrolidone

| Compolymerization Temperature ° C | Mol Percent Enantholactam Comonomer | Mw × $10^{-3}$ | Mol Percent Enantholactam in Copolymer[1] | $T_{50}$[2] ° C |
|---|---|---|---|---|
| 50 | 0 | 205 | — | 280 |
| 60 | 0 | 135 | — | 279 |
| 70 | 0 | 115 | — | 279 |
| 80 | 0 | 21 | — | 280 |
| 50 | 20 | 74 | 2 | 298 |
| 60 | 20 | 31 | 8 | 298 |
| 70 | 20 | 31 | 10 | 298 |
| 80 | 20 | 10 | 16 | 303 |

[1]See footnotes 1 and 2 of Table II.
[2]Temperature of copolymer, or polymer, at which it has suffered 50% weight loss, using temperature increase of 10° C/min., under $N_2$, in the Perkin-Elmer TGS-2.

Table IV demonstrates the increased thermal stability observed for copolymers of 2-pyrrolidone with higher lactams, over the homopolymer, polypyrrolidone. In this thermal stability test (a thermogravimetric analysis), a sample of polymer or copolymer is held under flowing nitrogen on the continuously heated pan of a microbalance which constantly monitors the sample weight. The temperature of the sample is programmed to increase at 10° C per 10 minutes, starting from room temperature. In the results of Table IV, equal weights of polymer or copolymer were taken as starting materials. From the thermogravimetric analysis, the temperature at which the sample had suffered a 50% loss of the initial weight was recorded ($T_{50}$ in the last column of Table IV). The higher this temperature ($T_{50}$), the more thermally stable the copolymer or polymer is. Differences of about 20° C in $T_{50}$ are very significant, since the polymer decomposes rapidly at temperatures higher than, but close to, its melting point. This makes melt-spinning to synthetic fibers very difficult. The increase in $T_{50}$ of 20° C is expected to effect a significant improvement in the melt-spinnability of the copolymer.

What is claimed is:

1. A process for the production of a solid polymer of 2-pyrrolidone and a lactam having 7–12 carbon atoms in its ring, which comprises polymerizing a mixture of 2-pyrrolidone and said lactam in the presence of a catalyst system consisting essentially of an alkaline polymerization catalyst, an auxiliary catalyst selected from the group consisting of quaternary Group VA onium halides; quaternary Group VA onium alkanoates, and mixtures thereof, carbon dioxide and a copolymerization promoter, at a temperature of at least about 40° C.

2. The process according to claim 1 wherein said alkaline polymerization catalyst is potassium or sodium pyrrolidonate.

3. The process according to claim 1 wherein said alkaline polymerization catalyst is a lactamate salt of an alkali metal.

4. The process according to claim 3 wherein said lactamate salt of an alkali metal is a pyrrolidonate.

5. The process according to claim 4 wherein said pyrrolidonate is potassium pyrrolidonate.

6. The process according to claim 1 wherein said auxiliary catalyst is a quaternary ammonium or phosphonium salt.

7. The process according to claim 6 wherein said halide is a chloride or bromide and said alkanoate is the alkanoate of a $C_1$–$C_6$ alkanoic acid.

8. The process according to claim 1 wherein said auxiliary catalyst is a quaternary ammonium salt.

9. The process according to claim 8 wherein said ammonium salt is a tetraalkyl ammonium halide.

10. The process according to claim 8 wherein said salt is a tetra($C_1$–$C_6$)alkyl ammonium halide.

11. The process according to claim 9 wherein said halide is tetramethyl ammonium chloride.

12. The process according to claim 1 wherein said copolymerization promoter is an N-acyl lactam.

13. The process according to claim 12 wherein said N-acyl lactam is N-acyl pyrrolidone.

14. The process according to claim 1 wherein said copolymerization promoter is 1-(1-pyrrolin-2-yl)-2-pyrrolidone.

15. The process according to claim 1 wherein said promoter is acetic anhydride, or N-acetyl pyrrolidone.

16. A process for the production of a solid copolymer of 2-pyrrolidone and a lactam having 7–12 carbon atoms in its ring, which comprises contacting 2-pyrrolidone, said lactam, an alkali metal lactamate, tetraalkyl ammonium halide, carbon dioxide and a N-acyl lactam to form a mixture, at a temperature of about 20°–50° C, and polymerizing said mixture at a temperature in excess of about 50° C.

17. The process of claim 16 wherein said polymerization is carried out at a temperature greater than about 50° and less than about 80° C for a period of about 8–48 hours.

18. The process according to claim 16 wherein said N-acyl lactam is selected from the group consisting of N-acetyl pyrrolidone, pyrrolinyl-pyrrolidone and acetic anhydride.

19. A process for the production of a solid copolymer of 2-pyrrolidone with a lactam having 7–12 carbon atoms in its ring, which comprises reacting 2-pyrrolidone with less than a stoichiometric amount of a source of alkali metal, removing the water formed during the reaction to obtain an essentially anhydrous solution of alkali metal pyrrolidonate in 2-pyrrolidone, contacting the solution with carbon dioxide, admixing with the solution a lactam having 7–12 carbon atoms in its ring, a tetraalkyl ammonium halide and a N-acyl lactam, and polymerizing the resulting mixture at a temperature of at least 40° C.

20. A process for the production of a solid copolymer of 2-pyrrolidone with a lactam having 7–12 carbon atoms in its ring which comprises copolymerizing a mixture of 2-pyrrolidone and said lactam in the presence of a catalyst system consisting essentially of an alkaline polymerization catalyst, a N-acyl lactam and an adduct of carbon dioxide and a lactam salt selected from the group consisting of a tetraalkyl ammonium salt of 2-pyrrolidone or lactams having 7–12 carbon atoms and mixtures thereof; and mixtures of said tetraalkyl ammonium salt with an alkali metal salt of said lactam, and mixtures thereof at a temperature of at least 40° C.

* * * * *